United States Patent [19]
Anquetil

[11] Patent Number: 5,674,789
[45] Date of Patent: Oct. 7, 1997

[54] LEAD- AND CADMIUM-FREE FINELY DIVIDED GLASS FRIT COMPOSITIONS

[75] Inventor: Jérôme Anquetil, Saint-Leonard-de-Noblat, France

[73] Assignee: Cerdec Aktiengesellschaft Keramische Farben, Frankfurt am Main, Germany

[21] Appl. No.: 605,892

[22] Filed: Feb. 23, 1996

Related U.S. Application Data

[63] Continuation-in-part of Ser. No. 328,058, Oct. 24, 1994, abandoned.

Foreign Application Priority Data

Nov. 25, 1993 [FR] France ................... 93 14127

[51] Int. Cl.$^6$ ........................................ C03C 3/15
[52] U.S. Cl. .................. 501/50; 501/22; 501/26
[58] Field of Search ................... 501/21, 25, 26, 501/50, 43

[56] References Cited

U.S. PATENT DOCUMENTS

| | | | |
|---|---|---|---|
| 3,677,778 | 7/1972 | Ali et al. | 501/50 |
| 3,773,528 | 11/1973 | Ali et al. | 501/50 |

FOREIGN PATENT DOCUMENTS

| | | | |
|---|---|---|---|
| 366931 | 3/1963 | Switzerland | 501/50 |
| 1678788 | 4/1989 | U.S.S.R. | |

*Primary Examiner*—Karl Group
*Attorney, Agent, or Firm*—Beveridge, DeGrandi, Weilacher & Young, L.L.P.

[57] ABSTRACT

A lead- and cadmium-free glass-frit composition based on a borate glass and containing 4 to 22 mole % $La_2O_3$ and 0 to 10 mole % $SiO_2$ as network-forming oxides and $B_2O_3$, wherein the molar ratio of $B_2O_3$ to $La_2O_3$ is at least 3 to 1. The compositions have an alpha in a range between approximately $50 \cdot 10^{-7} K^{-1}$ and approximately $100 \cdot 10^{-7} K^{-1}$ and the start of melting Td in a range between 470° and 670° C.

18 Claims, 8 Drawing Sheets

LEAD- AND CADMIUM-FREE FINELY DIVIDED GLASS FRIT COMPOSITIONS

REFERENCE TO A RELATED APPLICATION

This is a continuation-in-part of my U.S. patent application Ser. No. 08/328,058 filed 24 Oct. 1994, now abandoned, which is relied on and incorporated herein by reference in its entirety.

INTRODUCTION AND BACKGROUND

The present invention relates to a lead- and cadmium-free glass-frit composition based on a borate glass and to its use. Lanthanum oxide ($La_2O_3$) is an essential component of the composition whereas silica ($SiO_2$) is not present or is present only in a slight amount.

Glass frits are required for enamelling and decorating objects made of materials including glass, glass ceramics, porcelain, bone china and ceramics. Such frits will be formed of different compositions depending on the property profile required for the particular end use. Lead-containing glass frits based on silicate glasses are especially variable as regards properties such as the coefficient of thermal expansion, melting behavior and chemical resistance.

For toxicological reasons there is an increasing need for glass frits whose compositions contain neither lead nor cadmium. Various lead- and cadmium-free glass-frit compositions based on silicate glasses are already known, e.g. those with a high content of zinc oxide (e.g., EP-B 0,267,154 corresponding to U.S. Pat. No. 4,970,178 which is incorporated by reference in its entirety) or with a high bismuth oxide content (e.g., EP-A 0,347,379 corresponding to U.S. Pat. No. 4,892,847 which is incorporated by reference in its entirety) or a high zirconium and lithium content (e.g., EP-B 0,294,502); however, they are not capable, in spite of various desired properties, of always satisfying one or another requirement.

SUMMARY OF THE INVENTION

The present invention relates to novel lead- and cadmium-free glass-frit compositions which enable the selection of particular glass-frit compositions that are especially well suited for end uses. A feature of the present invention relates to glass-frit compositions exhibiting a very wide range of differing properties achievedby means of using only few feed materials but in different dosages.

Another feature of the present invention resides in a lead- and cadmium-free glass-frit composition based on a borate glass which composition is characterized in that it contains 4 to 22 mole % lanthanum oxide and 0 to 10 mole % silica as network-forming oxides and that the molar ratio of boric oxide ($B_2O_3$) to lanthanum oxide ($La_2O_3$) is in a range of at least 3 to 1.

BRIEF DESCRIPTION OF THE DRAWINGS

The present invention will be further understood with reference to the drawings, wherein.

DETAILED DESCRIPTION OF THE INVENTION

According to a more detailed aspect of the present invention, the glass-frit composition preferably contains less than 5 mole % $SiO_2$ and especially preferably essentially no $SiO_2$ (e.g., less than 1 mole % $SiO_2$).

The glass-frit compositions in accordance with the present invention customarily contain 2 to 24 mole % $La_2O_3$, 30 to 80 mole % $B_2O_3$ and one or several oxides from the series aluminum oxide, zinc oxide, alkali-metal oxides and alkaline-earth metal oxides in a total amount of 4 to 65 mole % but preferably essentially no $SiO_2$. In addition, compositions which are essentially free of $Li_2O$ are preferred, that is less than 1 mole % $Li_2O$. Preferred glass-frit compositions contain 4 to 22 mole % $La_2O_3$.

The borate glasses of the invention contain $BO_3$ groups and $LaO_3$ groups as essential network-forming groups. The viscosity of borate glasses is, in many instances, many times lower than that of silicate glasses (see Ullmann's Encyclopedia of Industrial Chemistry, 5th ed., 1989, volume A 12, pages 376–377) and this is also an advantage of the glass frits with the composition of the present invention.

It follows from the binary phase diagram $La_2O_3$-$B_2O_3$ that systems with an $La_2O_3$ content between 1 and approximately 25 mole % (e.g., about 24 mole %) in the liquid phase exhibit a miscibility gap in the liquid phase (see E. M. Levin et al., J. Amer. Ceram. Soc., 1961, 44(2): 89). This means that such compositions form unmixed glasses. It was surprisingly found that this unmixing can be avoided and a pure glass phase can also be stabilized in the area of the miscibility gap, that is at a molar ratio of $B_2O_3$ to $La_2O_3$ of between 3 to 1 and 99 to 1 if the composition additionally contains other oxides, including in particular $Al_2O_3$. Completely novel glass frits with a lower $La_2O_3$ content can be produced therewith than could have been expected, aside from glass frits with a molar ratio of $B_2O_3$ to $La_2O_3$ of greater than 99 to 1, which hardly differ, however, from pure borate glass.

As noted above, the molar ratio of $B_2O_3$ to $La_2O_3$ is at least 3. The upper limit of the molar ratio arises from the content of $La_2O_3$ and the content of the other oxides (excepting $B_2O_3$) and is easily calculated by a person skilled in the art. For example, with 4 mole % $La_2O_3$ and 4 mole % other oxides, the molar ratio of $B_2O_3$ to $La_2O_3$ is calculated as (100–4–4) to 4 (=23 to 1).

Preferred glass-frit compositions contain 4 to 22 mole % $La_2O_3$, 45 to 75 mole % $B_2O_3$, 0 to 25 mole % $Al_2O_3$, 0 to 30 mole % ZnO, 0 to 25 mole % $Na_2O$, 0 to 10 mole % $K_2O$ and 0 to 10 mole % CaO and/or BaO in which the total amount of $Al_2O_3$, ZnO, $Na_2O$, $K_2O$, CaO and BaO is 10 to 50 mole % and oxides other than those previously named (e.g., $Al_2O_3$, ZnO, $Na_2O$, $K_2O$, CaO and BaO) can be present in an amount of up to a total of 10 mole %.

The composition of especially preferred glass frits contain 4 to 22 mole % $La_2O_3$, 50 to 70 mole % $B_2O_3$, 0 to 20 mole % $Al_2O_3$, 0 to 25 mole % ZnO, 0 to 20 mole % $Na_2O$, 0 to 10 mole % $K_2O$ and 0 to 10 mole % CaO and/or BaO
and the sum of $Al_2O_3$ and ZnO is 10 to 30 mole % and the sum of the cited alkali metal oxides and alkaline-earth metal oxides is 4 to 20 mole %.

The glass-frit composition is produced in a known manner, that is, by melting a mixture of initial substances at temperatures between 800° and 1300° C. and by a subsequent rapid cooling off (quenching) of the melt in water, which melting normally takes place in a ceramic crucible of fire-resistant material or in a furnace with suitable jacketing.

The initial substances are charged in the form of their oxides or other compounds formed under melting conditions into the mixture to be melted; for example, alkali metals are frequently added in the form of their carbonates. In as far as the glass frits should contain fluoride, the latter is generally added in the form of alkali- and/or alkaline-earth fluorides or of $Na_3AlF_6$. After the melting and quenching of the glass frits, the granulates, flakes or other frit fragments are comminuted to form a finely divided glass frit composition of the invention.

The examples show that the selection of the various components as well as their amount are conditioned by the chemico-physical properties desired:

In the case of the glass-frit compositions in accordance with the present invention, the addition of lanthanum trioxide results in an improvement of the chemical resistance (resistance to acid and lye) and to a diminution of the meltability of the glass. The lanthanum ion $La^{3+}$, just as silicon $Si^{4+}$ in a silicate glass, thus acts as a network former in this type of glass.

Figure 1A:
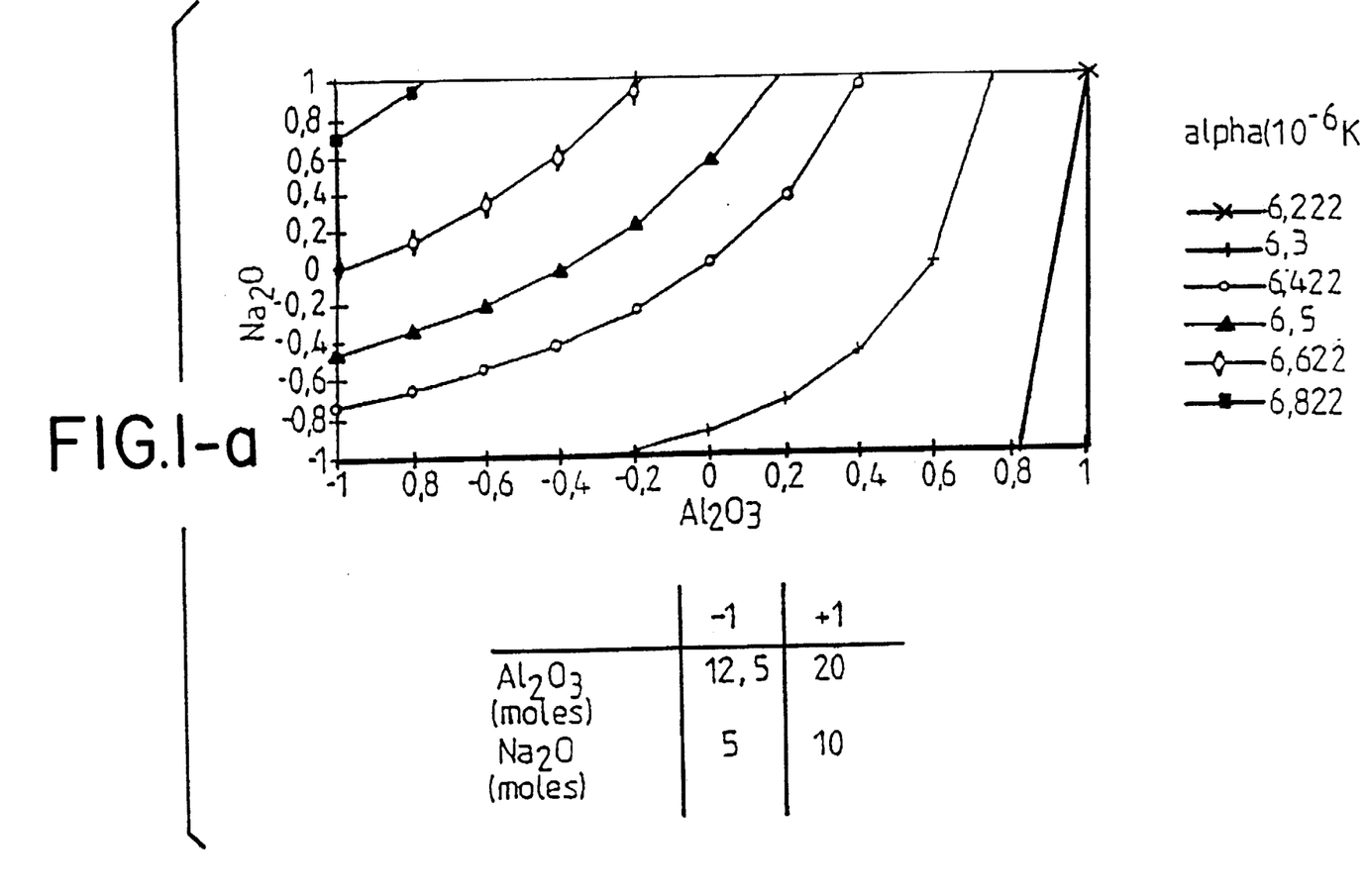
FIGS. 1a (alpha) and 1b(Td) are graphs of the combined influence of $Na_2O$ and $Al_2O_3$ as additives to compositions starting from a molar ratio of 12.5 $La_2O_3$ and 75 $B_2O_3$ (composition in moles)
Figure 1B:
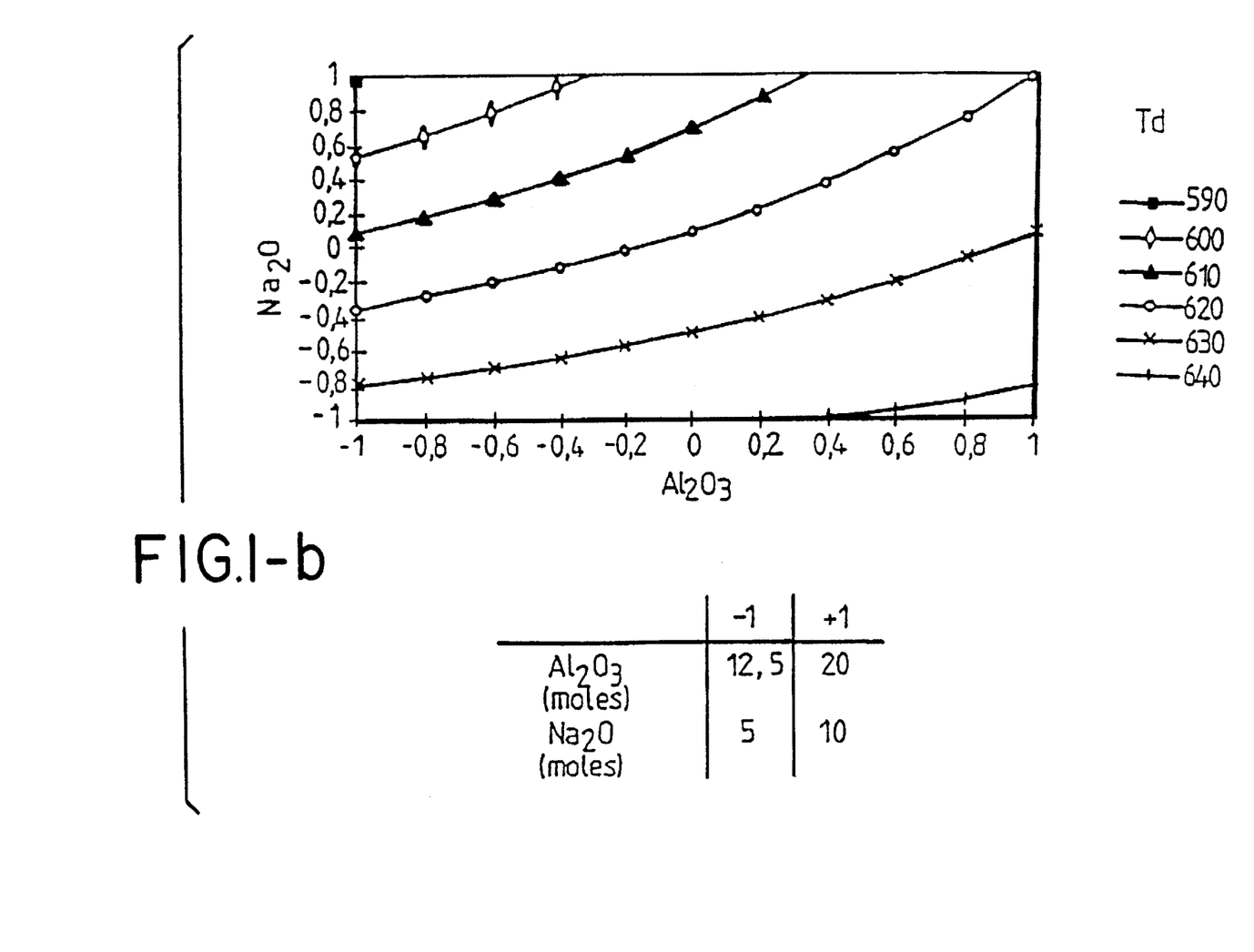

As the $Al_2O_3$ content increases, the average coefficient of thermal expansion alpha $(\alpha_{20/300°C} \cdot 10^{-7K-1})$ and the start of melting Td ($\eta=10^{7.6}$ dPas; ASTM C338-73) rises. This is shown in FIG. 1a and FIG. 1b respectively.

As the $Na_2O$ content rises, alpha rises and Td decreases. This is shown in FIG. 1a and FIG. 1b respectively.

As the ZnO content rises, the acid resistance and alpha increase and Td decreases.

As the BaO content rises, alpha decreases and Td increases.

As the $TiO_2$ content rises, the acid resistance increases.

It was found that glass frits can be obtained with only a few oxides, namely, $B_2O_3$, $La_2O_3$ as well as $Al_2O_3$ and/or ZnO and, in general, $Na_2O$, which can also be entirely or partially substituted by CaO and/or BaO, the properties of which frits can be very different: Thus, in the case of frits according to the example(s) alpha was e.g. in a range between approximately $50 \cdot 10^{-7}K^{-1}$ and approximately $100 \cdot 10^{-7}K^{-1}$ and the start of melting Td in a range between 470° and about 670° C.

Many areas of end use application can be opened up with the glass frits of the glass-frit compositions of the present invention and on account of the properties which can be adjusted in an easy and purposeful manner, for which areas of application lead-containing silicate glasses were previously required.

The frits obtained with the frit compositions of the present invention, that is, depending of the composition of the oxides added, in combination with one or more inorganic pigments make it possible to produce enamel for the decoration of glass, ceramics or porcelain. The glass structures of the silicate-free but boron- and lanthanum-containing frits of the present invention are meltable at temperatures which are required both in the bending process of laminated glass and also in the bending process of hardening glass; for this reason the frit compositions of the present invention are suitable both for the manufacture of windshield panes, rear or side panes, and panoramic roofs as well as of plates and other objects of glass or ceramics.

The pasting medium for the glass frits of the present invention and for pigments and, if desired, further additives is selected with regard to the planned application. It is very important that the medium forms a suspension with the particles and completely burns during the firing process. Generally inert organic binders or vehicles of a conventional nature are used for this purpose.

As explained, the frit compositions of the present invention as well as the corresponding frits open up areas of use which were reserved up to the present primarily for lead-containing silicate frits. The novel frits of the present invention make substances available to the expert in the art which permit him to be able to select an optimum frit for the particular application from a broader spectrum of frit compositions. To prepare an enamel, for example, on the surface of an article formed of glass, porcelain or ceramic, a paste of the glass frit is deposited according to the desired design and is fired at a suitable temperature to burn out the binder and fuse the glass frit particles into an enamel.

EXAMPLES 1 TO 3

The frit with the composition according to example 1 was produced for use in enamels for rear or side panes and panoramic roofs (single-pane glass) on automobiles.

The frits with the composition according to examples 2 and 3 were produced for use in enamels for windshield panes (laminated glass) for automobiles.

| Example No. | 1 Mol-% | 2 Mol-% | 3 Mol-% |
| --- | --- | --- | --- |
| $La_2O_3$ | 5.14 | 4.94 | 9.27 |
| $B_2O_3$ | 59.29 | 57.03 | 55.55 |
| $Al_2O_3$ | 15.81 | 15.21 | 9.26 |
| ZnO | 11.86 | 11.41 | 14.81 |
| $Na_2O$ | 7.9 | 11.41 | 11.11 |

EXAMPLES 4 TO 39

The following three series of compositions were investigated:

* Series with the designation "6 5", starting from a molar ratio of 6.5 $La_2O_3$ to 75 $B_2O_3$.

* Series with the designation "12.5", starting from a molar ratio of 12.5 $La_2O_3$ to 75 $B_2O_3$.

* Series with the designation "25", starting from a molar ratio of 25 $La_2O_3$ to 75 $B_2O_3$.

The composition of a total of 39 examples (including examples 1 to 3) is presented in tables 1a (series 6.5), 2a (series 12.5) and 3a (series 25). A further table—No. 1b, 2b and 3b—belongs to each series in which table the examples are cited in the sequence of their linear coefficient of thermal expansion (alpha); tables 1b, 2b and 3b also contain the start of softening (Td) of the 39 frits.

TABLE 1a

"series 6.5"

| Example | 4 | 5 | 2 | 6 | 7 | 2 |
|---|---|---|---|---|---|---|
| $La_2O_3$ | 4.76 | 4.94 | 4.94 | 5.14 | 5.14 | 5.14 |
| $B_2O_3$ | 54.94 | 57.03 | 57.03 | 59.29 | 59.29 | 59.29 |
| $Al_2O_3$ | 14.65 | 15.21 | 15.21 | 15.81 | 15.81 | 15.81 |
| ZnO | 10.99 | 11.41 | 11.41 | 11.86 | 11.86 | 11.86 |
| $Na_2O$ | 14.65 | 7.6 | 11.41 | 3.95 | | 7.9 |
| BaO | | 3.8 | | 3.95 | 7.9 | |

(the compositions are indicated in mol %).

TABLE 1b

"series 6.5 - alpha and Td"

| Example No. | alpha $10^{-7} K^{-1}$ | Td (°C.) |
|---|---|---|
| 6 | 55.3 | 594 |
| 1 | 57.9 | 612 |
| 7 | 61.9 | 551 |
| 2 | 63.7 | 579 |
| 5 | 70.9 | 537 |
| 4 | 88.0 | 476 |

TABLE 2a

"series 12.5"

| | Example | | | | | | | | | |
|---|---|---|---|---|---|---|---|---|---|---|
| | 8 | 9 | 10 | 11 | 12 | 13 | 3 | 14 | 15 | 16 |
| $La_2O_3$ | 8.77 | 8.77 | 8.93 | 8.93 | 8.93 | 9.09 | 9.27 | 9.43 | 9.43 | 9.61 |
| $B_2O_3$ | 52.63 | 52.63 | 53.47 | 53.57 | 53.57 | 54.54 | 55.55 | 56.6 | 56.6 | 57.69 |
| $Al_2O_3$ | 8.77 | 8.77 | 8.93 | 8.93 | 8.93 | 9.09 | 9.26 | 9.43 | 15.09 | 9.61 |
| ZnO | 14.03 | 14.03 | 14.28 | 14.28 | 14.28 | 14.54 | 14.81 | 15.09 | 11.32 | 15.38 |
| $Na_2O$ | 8.77 | 15.79 | 10.71 | 7.14 | 14.28 | 12.73 | 11.11 | 9.43 | 7.55 | 7.69 |
| BaO | 7.02 | | 3.57 | 7.14 | | | | | | |

| | Example | | | | | | | | | |
|---|---|---|---|---|---|---|---|---|---|---|
| | 17 | 18 | 19 | 20 | 21 | 22 | 23 | 24 | 25 | 26 |
| $La_2O_3$ | 9.61 | 10 | 10 | 10 | 10 | 10.42 | 10.42 | 10.42 | 10.42 | 10.64 |
| $B_2O_3$ | 57.69 | 60 | 60 | 60 | 60 | 62.5 | 62.5 | 62.5 | 62.5 | 63.83 |
| $Al_2O_3$ | 9.61 | 10 | 10 | 10 | 10 | 10 | 10.42 | 10.42 | 6.25 | 17.02 |
| ZnO | 11.54 | 12 | 12 | 12 | 12 | 16.67 | 12.5 | 8.33 | 12.5 | |
| $Na_2O$ | 11.54 | 4 | | 4 | 8 | | 4.17 | 8.33 | 8.33 | 8.51 |
| BaO | | 4 | 8 | | | | | | | |
| CaO | | | | 4 | | | | | | |

| | Example | | | | | | | | |
|---|---|---|---|---|---|---|---|---|---|
| | 27 | 28 | 29 | 30 | 31 | 32 | 33 | 34 | 35 |
| $La_2O_3$ | 10.87 | 10.87 | 10.87 | 10.87 | 11.11 | 11.36 | 11.36 | 11.9 | 12.5 |
| $B_2O_3$ | 65.22 | 65.22 | 65.22 | 65.22 | 66.67 | 68.18 | 68.18 | 71.43 | 75.0 |
| $Al_2O_3$ | 10.87 | 6.52 | 10.87 | 6.52 | 17.78 | 6.82 | 11.36 | 11.9 | 12.5 |
| ZnO | 13.04 | 13.04 | 8.69 | 8.69 | | 9.09 | | | |
| $Na_2O$ | | 4.35 | 4.35 | 8.69 | 4.45 | 4.54 | 9.09 | 4.76 | |

TABLE 2b

"series 12.5 - alpha and Td"

| Example No. | alpha $10^{-7}K^{-1}$ | Td (°C.) |
|---|---|---|
| 22 | 52.0 | 659 |
| 27 | 53.6 | 665 |
| 35 | 53.8 | 677 |
| 18 | 59.6 | 596 |
| 19 | 60.0 | 620 |
| 32 | 61.8 | 614 |
| 20 | 61.9 | 619 |
| 14 | 62.0 | 586 |
| 31 | 62.1 | 612 |
| 26 | 62.2 | 620 |
| 28 | 62.5 | 609 |
| 23 | 62.4 | 607 |
| 29 | 63,2 | 603 |
| 34 | 63.5 | 635 |
| 15 | 68.0 | 600 |
| 16 | 68.6 | 622 |
| 21 | 68.8 | 595 |
| 25 | 68.9 | 586 |
| 33 | 69.0 | 589 |
| 24 | 71.9 | 597 |
| 13 | 73.2 | 577 |
| 10 | 75.1 | 554 |
| 11 | 75.7 | 543 |
| 30 | 76.8 | 559 |
| 3 | 78.9 | 522 |
| 8 | 80.2 | 520 |
| 17 | 80.9 | 537 |
| 12 | 84.3 | 516 |
| 9 | 87.6 | 488 |

TABLE 3a

"Series 25"

| Example | 36 | 37 | 38 | 39 |
|---|---|---|---|---|
| $La_2O_3$ | 17.86 | 19.23 | 21.19 | 21.74 |
| $B_2O_2$ | 53.57 | 57.69 | 63.56 | 65.22 |
| $Al_2O_3$ | | | 2.54 | |
| ZnO | 21.43 | 23.08 | 12.71 | 13.04 |
| $Na_2O$ | 7.14 | | | |

TABLE 3b

"Series 25 - alpha and Td"

| Example No. | alpha $10^{-7}K^{-1}$ | Td (°C.) |
|---|---|---|
| 37 | 60.0 | 666 |
| 39 | 63.0 | 674 |
| 38 | 67.6 | 662 |
| 36 | 74.2 | 574 |

Table 4 shows the influence of $Na_2O$ as additive to the following composition of the series 6.5: 6.5 $La_2O_3$, 75 $B_2O_3$, 20 $Al_2O_3$, 14 ZnO (composition in moles). Only the mole content of $Na_2O$ changes.

TABLE 4

| Example No. | $Na_2O$ | $\alpha$ $10^{-6}K^{-1}$ | Td in °C. |
|---|---|---|---|
| 7 | 10 | 6.193 | 551 |
| 5 | 15 | 7.086 | 532.4 |
| 4 | 20 | 8.798 | 476.3 |

The combined influence of $Na_2O$ and $Al_2O_3$ as additive to the following composition of the series 12.5: 12.5 $La_2O_3$, 75 $B_2O_3$ is shown in FIGS. 1a (alpha) and 1b (Td). FIG. 1 shows sets of curves for the indicated values for the average coefficients of thermal expansion alpha (FIG. 1) and the temperature Td (start of melting) (FIG. 1b) from which the molar composition of glass frits with the desired values for alpha and Td can be determined with the aid of the boundary values for $Al_2O_3$ and $Na_2O$ (data in moles) indicated in the figure and with the aid of the composition of the initial mixture.

Figure 2A:
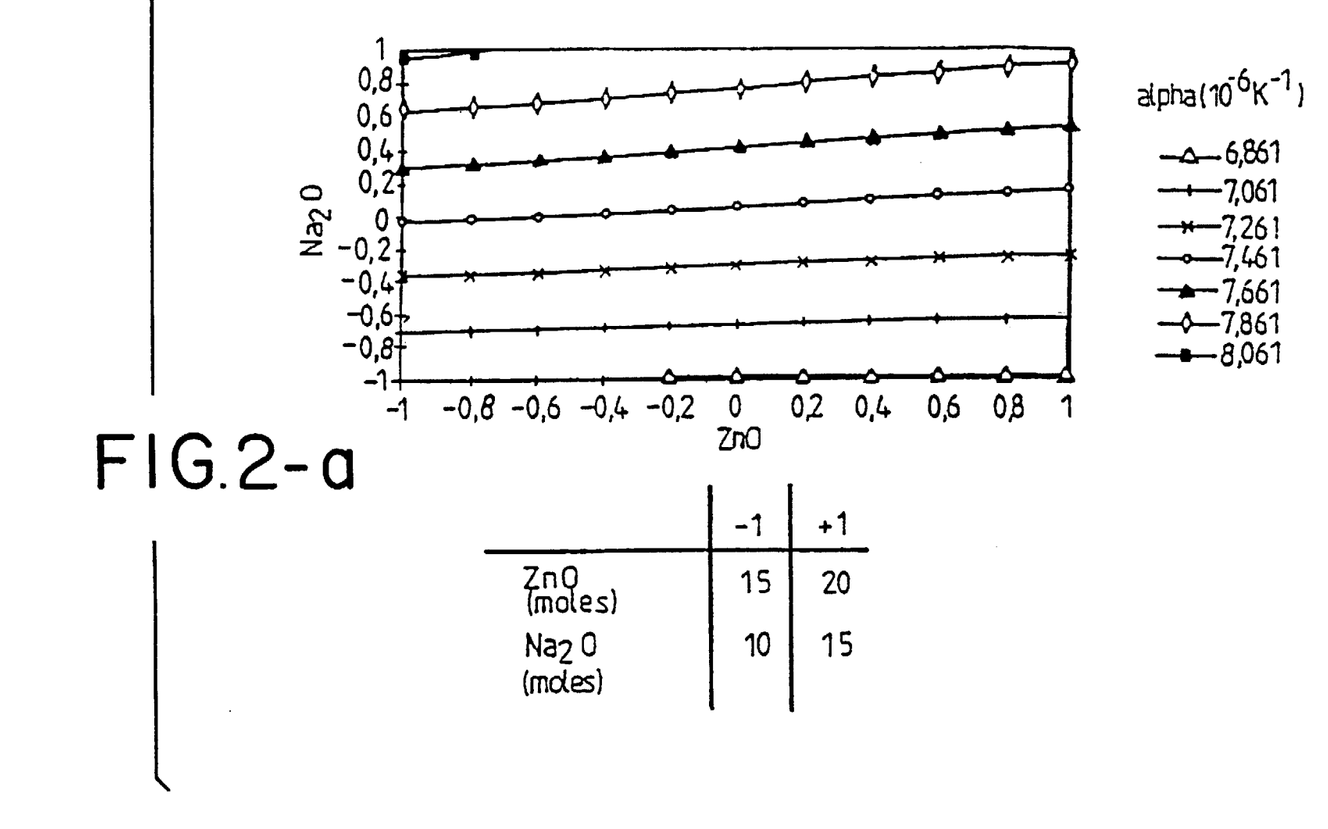
FIGS. 2a and 2c (alpha) and 2b and 2d (Td) are graphs of the combined influence of $Na_2O$ and ZnO as additives to compositions starting from a molar ratio of 12.5 $La_2O_3$, 75 $B_2O_3$, 12 $Al_2O_3$ (composition in moles)
Figure 2B:
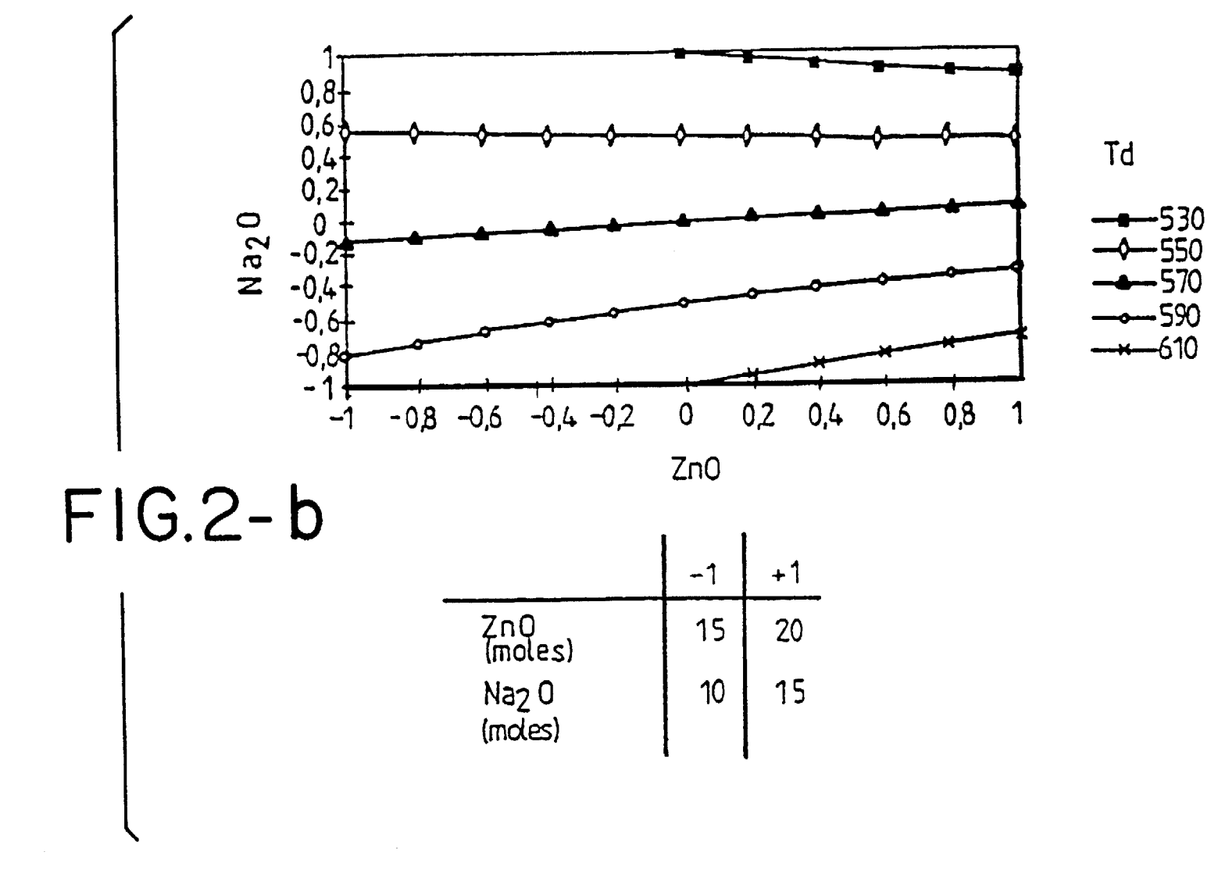
Figure 2C:
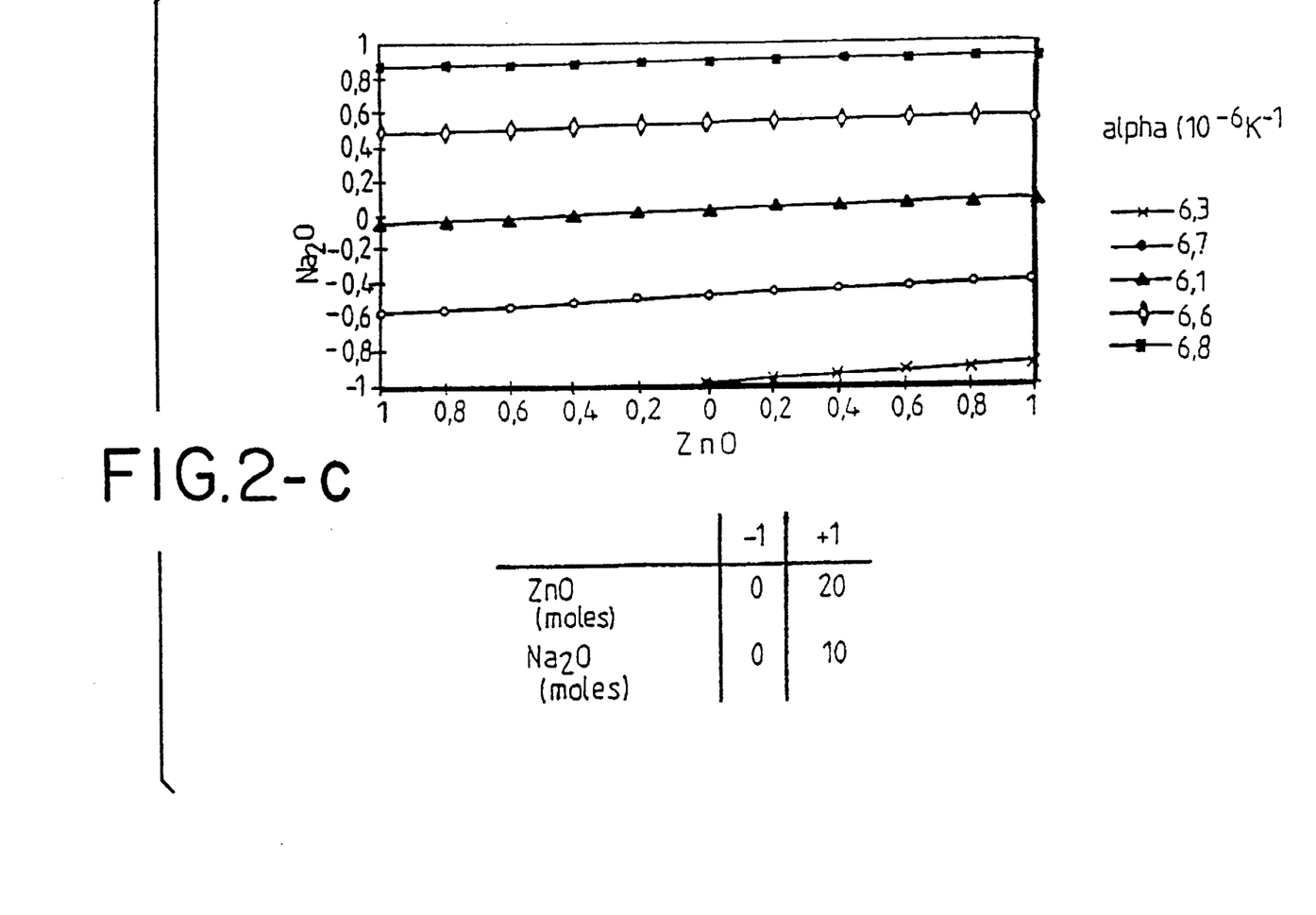
Figure 2D:
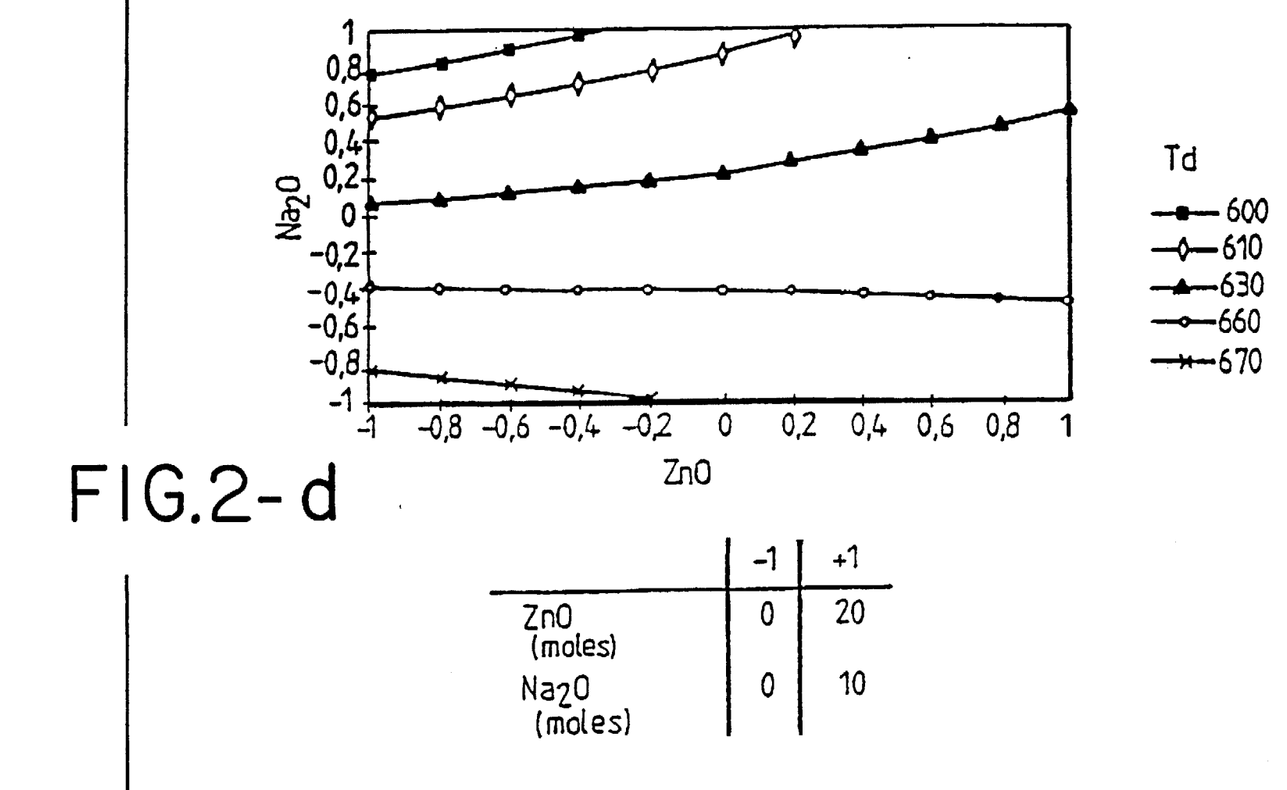

The combined influence of $Na_2O$ and ZnO as additive to the following composition of the series 12.5: 12.5 $La_2O_3$, 75 $B_2O_3$, 12 $Al_2O_3$ (composition in moles) is shown in FIGS. 2a (alpha) and 2b (Td) and is continued in FIGS. 2c (alpha) and 2d (Td). The molar composition of glass frits with the desired values for alpha and Td can be determined in conjunction with the composition of the initial mixture from the sets of curves for alpha and Td as well as from the indicated boundary values for ZnO and $Na_2O$.

Figure 3A:
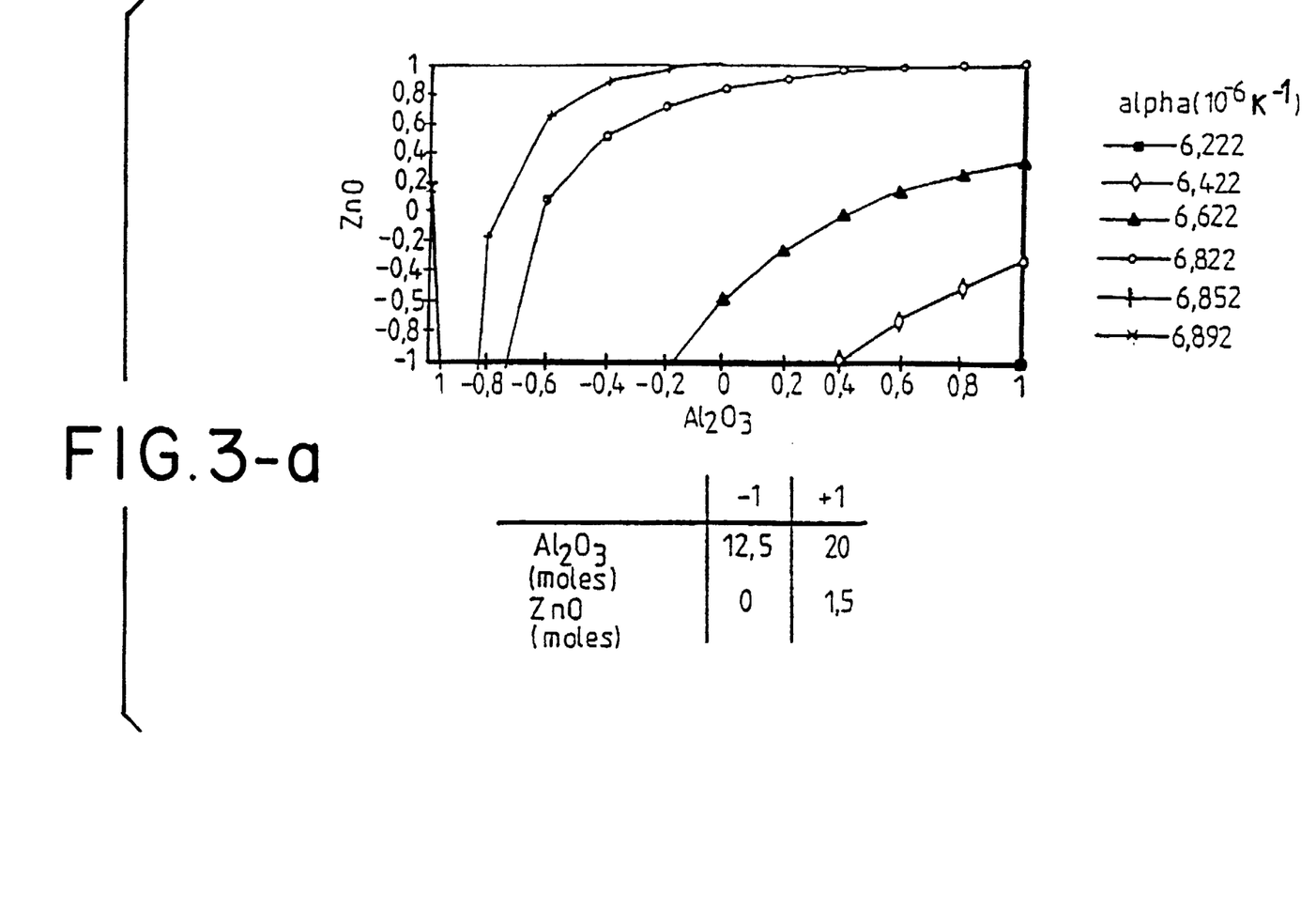
FIGS. 3a (alpha) and 3b(Td) are graphs of the combined influence of ZnO and $Al_2O_3$ as additives to compositions starting from a molar ratio of 12.5 $La_2O_3$, 75 $B_2O_3$, 10 $Na_2O$ (composition in moles).
Figure 3B:
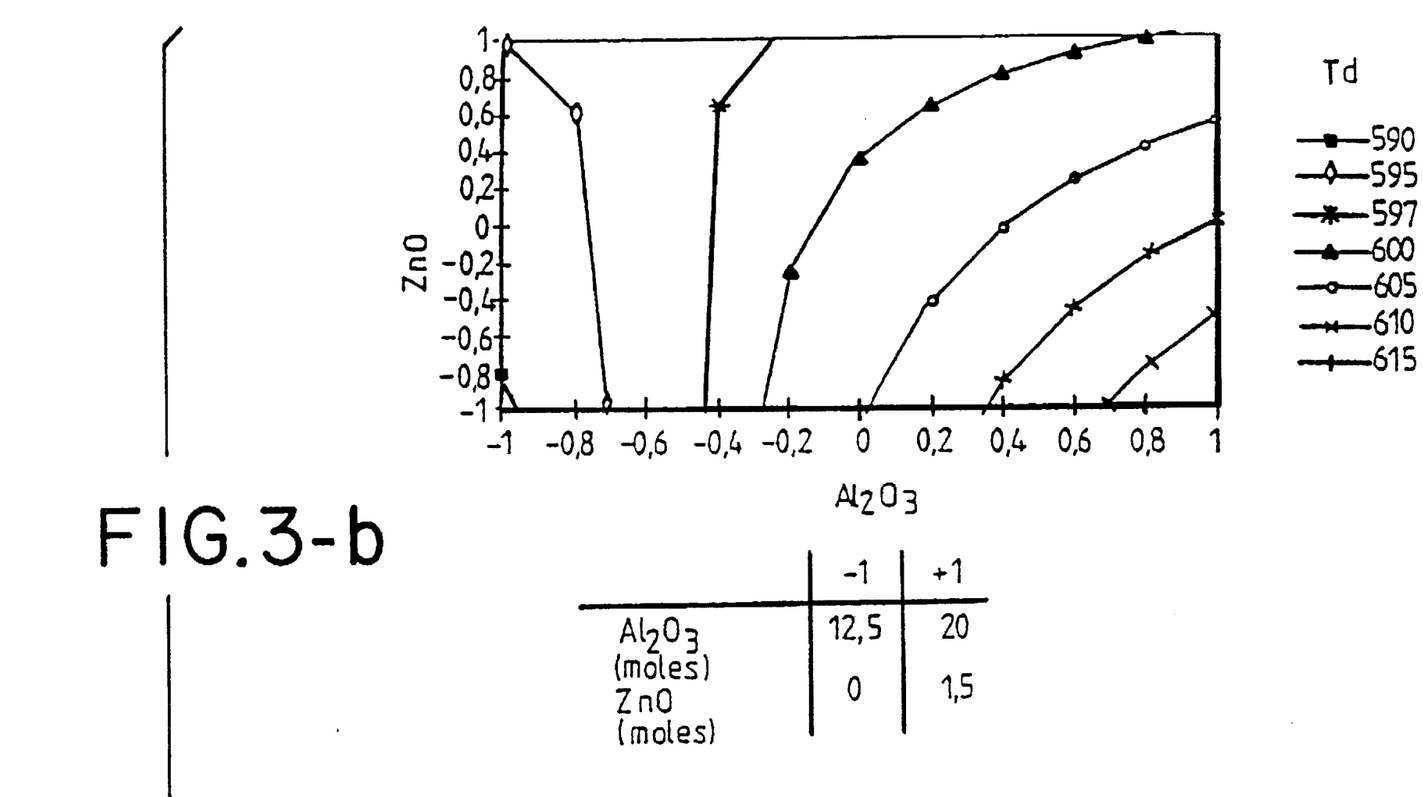

The combined influence of ZnO and $Al_2O_3$ as additive to the following composition of the series 12.5: 12.5 $La_2O_3$, 75 $B_2O_3$, 10 $Na_2O$ (composition in moles) is shown in FIGS. 3a (alpha) and 3b (Td). The molar composition of glass frits with the desired values for alpha and Td can be determined in conjunction with the composition of the initial mixture from the sets of curves for alpha and Td as well as from the indicated boundary values for $Al_2O_3$ and ZnO.

Table 5 contains the compositions (in moles) and shows how the replacement of $Na_2O$ by BaO takes effect in the series 6.5 and 12.5.

Series 12.5: 12.5 $La_2O_3$ - 75 $B_2O_3$ - 12.5 $AL_2O_3$ - 15 ZnO - [10-x]$Na_2O$ - xBaO.

Series 6.5: 6.5 $La_2O_3$ - 75 $B_2O_3$ - 20 $Al_2O_3$ - 15 ZnO - [10-x]$Na_2O$ - xBaO.

TABLE 5

| No. | $La_2O_3$ | $B_2O_3$ | $Al_2O_3$ | ZnO | $Na_2O$ | BaO | alpha $10^{-7}K^{-1}$ | Td °C. |
|---|---|---|---|---|---|---|---|---|
| 21 | 12.5 | 75 | 12.5 | 15 | 10 | | 68.8 | 595 |
| 18 | 12.5 | 75 | 12.5 | 15 | 5 | 5 | 59.6 | 596 |
| 20 | 12.5 | 75 | 12.5 | 15 | | 10 | 61.9 | 619 |
| 7 | 6.5 | 75 | 20 | 15 | 10 | | 61.9 | 551 |
| 6 | 6.5 | 75 | 20 | 15 | 5 | 5 | 55.3 | 594 |
| 1 | 6.5 | 75 | 20 | 15 | | 10 | 57.9 | 612 |

(indication of the oxide contents of the composition in moles)

According to table 5 the partial replacement of $Na_2O$ by BaO results in a distinct lowering of alpha with a simultaneous slight elevation of Td. The effect on alpha is greater in this instance.

Further variations and modifications of the foregoing will be apparent to those skilled in the art and such variations and modifications are attended to be encompassed by the claims that are appended hereto.

French Priority Application 93 14127, filed on Nov. 25, 1993, are relied on and incorporated by reference.

What is claimed:

1. A finely divided lead- and cadmium-free glass-frit composition based on a borate glass, said composition consisting essentially of 4 to 22 mole % $La_2O_3$ as network-forming oxide, 30 to 80 mole % $B_2O_3$, at least one oxide selected from the group consisting of alkali-metal oxide, alkaline-earth metal oxide, aluminum oxide, zinc oxide, and mixtures thereof in a total amount of 4 to 65 mole %, other oxides other than $Al_2O_3$, ZnO, $Na_2O$, $K_2O$, CaO and BaO in the amount of up to a total of 10 mole %, and optionally fluoride added in the form of alkali- and/or alkaline-earth fluorides or of $Na_3AlF_6$, wherein the molar ratio of $B_2O_3$ to $La_2O_3$ is at least 3 and less than 1 mole % $SiO_2$ and less than 1 mole % $Li_2O$.

2. The glass-frit composition according to claim 1, wherein said composition consists essentially of 4 to 22 mole % $La_2O_3$, 50 to 70 mole % $B_2O_3$, 0 to 20 mole % $Al_2O_3$, 0 to 25 mole % ZnO, 0 to 20 mole % $Na_2O$, 0 to 10 mole % $K_2O$ and 0 to 10 mole % CaO and/or BaO, wherein the sum of $Al_2O_3$ and ZnO is 10 to 30 mole % and wherein the sum of $Na_2O$, $K_2O$, CaO and BaO is 4 to 20 mole %.

3. The glass-frit composition according to claim 1, wherein said at least one oxide is $Al_2O_3$.

4. The glass-frit composition according to claim 3, wherein said composition is essentially free of $SiO_2$.

5. The glass-frit composition according to claim 1, wherein said composition has a coefficient of thermal expansion, alpha, in a range between approximately $50 \cdot 10^{-7} K^{-1}$ and approximately $100 \cdot 10^{-7} K^{-1}$ and the start of melting Td in a range between 470° and about 670° C.

6. The glass-frit composition according to claim 1, wherein said composition consists of 4 to 22 mole % $La_2O_3$ as network-forming oxide, 30 to 80 mole % $B_2O_3$, at least one oxide selected from the group consisting of alkali-metal oxide, alkaline-earth metal oxide, aluminum oxide, zinc oxide, and mixtures thereof in a total amount of 4 to 65 mole %, and optionally fluoride added in the form of alkali- and/or alkaline-earth fluorides or of $Na_3AlF_6$, wherein the molar ratio of $B_2O_3$ to $La_2O_3$ is at least 3 and said composition contains less than 1 mole % $SiO_2$.

7. The glass-frit composition according to claim 1, wherein said molar ratio of $B_2O$ to $La_2O_3$ is about 11.5.

8. The glass-frit composition according to claim 1, wherein composition consists essentially of 4 to 22 mole % $La_2O_3$, 45 to 75 mole % $B_2O_3$, 0 to 25 mole % $Al_2O_3$, 0 to 30 mole % ZnO, 0 to 25 mole % $Na_2O$, 0 to 10 mole % $K_2O$ and 0 to 10 mole % CaO and/or BaO, wherein the sum of $Al_2O_3$, Zno, $Na_2O$, $K_2O$, CaO add BaO is 10 to 50 mole %, and at least one oxide other than $Al_2O_3$, ZnO, $Na_2O$, $K_2O$, CaO and BaO is present up to 10 mole %.

9. A finely divided lead- and cadmium-free glass-frit composition based on a borate glass, said composition consisting essentially of 4 to 22 mole % $La_2O_3$ as network-forming oxide, 30 to 80 mole % $B_2O_3$, at least one oxide selected from the group consisting of alkali-metal oxide, alkaline-earth metal oxide, aluminum oxide, zinc oxide, and mixtures thereof in a total amount of 4 to 65 mole %, other oxides other than $Al_2O_3$, ZnO, $Na_2O$, $K_2O$, CaO and BaO in an amount of up to a total of 10 mole % and optionally fluoride added in the form of alkali- and/or alkaline-earth fluorides or of $NA_3AlF_6$, wherein the molar ratio of $B_2O_3$ to $La_2O_3$ is at least 3, the amount of $Al_2O_3$ is between 0 and 9.43 mole % and the amount of ZnO is between 0 and 15.06 mole % and $SiO_2$ is less than 1 mole %.

10. The glass-frit composition according to claim 9, wherein said composition consists essentially of 4 to 22 mole % $La_2O_3$, 50 to 70 mole % $B_2O_3$, 0 to 9.43 mole % $Al_2O_3$, 0 to 15.06 mole % ZnO, 0 to 20 mole % $Na_2O$, 0 to 10 mole % $K_2O$ and 0 to 10 mole % CaO and/or BaO, wherein the sum of $Al_2O_3$ and ZnO is 10 to 24.49 mole % and wherein the sum of $Na_2O$, $K_2O$, CaO and BaO is 4 to 20 mole %.

11. The glass-frit composition according to claim 9, wherein the amount of $Li_2O$ in said composition is less than 1 mole % $Li_2O$.

12. The glass-frit composition according to claim 9 wherein said composition is free of $SiO_2$.

13. The glass-frit composition according to claim 9, wherein said composition has a coefficient of thermal expansion, alpha, in a range between approximately $50.10^{-7} K^{-1}$ and approximately $100.10^{-7} K^{-1}$ and the start of melting Td in a range between 470° and about 670° C.

14. The glass-frit composition according to claim 9, wherein said at least one oxide is $Al_2O_3$.

15. The glass-frit composition according to claim 9, wherein said composition consists of 4 to 22 mole % $La_2O_3$ as network-forming oxide, 30 to 80 mole % $B_2O_3$, at least one oxide selected from the group consisting of alkali-metal oxide, alkaline-earth metal oxide, aluminum oxide, zinc oxide, and mixtures thereof in a total amount of 4 to 65 mole %, and optionally fluoride added in the form of alkali- and/or alkaline-earth fluorides or of $Na_3AlF_6$, wherein the molar ratio of $B_2O_3$ to $La_2O_3$ is at least 3 and said composition contains less than 1 mole % $SiO_2$.

16. The glass-frit composition according to claim 9, wherein said molar ratio of $B_2O_3$ to $La_2O_3$ is about 11.5.

17. The glass-frit composition according to claim 9, wherein said composition consists essentially of 4 to 22 mole % $La_2O_3$, 45 to 75 mole % $B_2O_3$, 0 to 9.43 mole % $Al_2O_3$, 0 to 15.86 mole % ZnO, 0 to 25 mole % $N_2O$, 0 to 10 mole % $K_2O$ and 0 to 10 mole % CaO and/or BaO, wherein the sum of $Al_2O_3$, ZnO, $Na_2O$, $K_2O$, CaO and BaO is 10 to 50%, and said at least one oxide other than $Al_2O_3$, ZnO, $Na_2O$, $K_2O$, CaO and BaO is present up to 10 mole %.

18. A finely divided lead- and cadmium-free glass-frit composition based on a borate glass, said composition consisting essentially of 4 to 22 mole % $Li_2O_3$ as network-forming oxide, 30 to 80 mole % $B_2O_3$, at least one oxide selected from the group consisting of alkali-metal oxide, alkaline-earth metal oxide, aluminum oxide, zinc oxide, and mixtures thereof in a total amount of 4 to 65 mole %, other oxides other than $Al_2O_3$, ZnO, $Na_2O$, $K_2O$, CaO and BaO in an amount of up to a total of 10 mole % and optionally fluoride added in the form of alkali- and/or alkaline-earth fluorides or of $NA_3Alf_6$, wherein the molar ratio of $B_2O_3$ to $La_2O_3$ is at least 3, the amount of $Al_2O_3$ is between 0 and 9.43 mole % and the amount of ZnO is between 0 and 15.06 mole % and the amount of $SiO_2$ is less than 1 mole %, said glass-frit having been prepared by forming a melt of the foregoing components, and quenching said melt to obtain a finely divided glass-frit composition.

* * * * *